United States Patent [19]

Ozaki et al.

[11] Patent Number: 4,492,109
[45] Date of Patent: Jan. 8, 1985

[54] KNOCKING DETECTION APPARATUS FOR AN INTERNAL COMBUSTION ENGINE

[75] Inventors: Tadashi Ozaki, Gamagori; Tadashi Hattori; Kazuhiko Miura, both of Okazaki; Masanori Hanaoka; Yukihide Hashiguchi, both of Toyota, all of Japan

[73] Assignees: Nippon Soken, Inc., Nishio; Toyota Jidosha Kabushiki Kaisha, Toyota, both of Japan

[21] Appl. No.: 433,878

[22] Filed: Oct. 13, 1982

[30] Foreign Application Priority Data

Oct. 14, 1981 [JP] Japan .............................. 56-164842
Oct. 14, 1981 [JP] Japan .......................... 56-153423[U]

[51] Int. Cl.³ ........................................... G01L 23/22
[52] U.S. Cl. ........................................... 73/35; 73/714
[58] Field of Search ........................... 73/35, 116, 714

[56] References Cited

U.S. PATENT DOCUMENTS

| 2,403,774 | 7/1946 | Whitty et al. | 73/35 |
| 4,299,117 | 11/1981 | Andrews et al. | 73/35 |
| 4,408,479 | 10/1983 | Asai et al. | 73/35 |

Primary Examiner—James J. Gill
Attorney, Agent, or Firm—Cushman, Darby & Cushman

[57] ABSTRACT

A knocking detection apparatus for multi-cylinder engines, capable of detecting knocking through sensing pressure pulsation propagating through the cooling water flowing in a cylinder block surrounding the cylinders. The knocking detection apparatus has a diaphragm facing the space downstream from the detection apparatus as viewed in the direction of flow of the cooling water, and a transducer dixed to the diaphragm.

4 Claims, 12 Drawing Figures

4,492,109

KNOCKING DETECTION APPARATUS FOR AN INTERNAL COMBUSTION ENGINE

BACKGROUND OF THE INVENTION

Field of the Invention

The present invention relates to an apparatus for detecting the knocking occurred in a cylinder or cylinders of an internal combustion engine, suitable for use in an ignition timing control system in which an ignition apparatus is controlled so as to optimize the ignition timing. More particularly, the invention is concerned with an apparatus for detecting knocking occurred in a cylinder or cylinders of an internal combustion engine by sensing a pressure pulsation propagating through cooling water flowing around the cylinders.

BRIEF DESCRIPTION OF THE DRAWINGS

FIG. 1 is a cross-sectional view of a knocking detection apparatus constructed in accordance with a fourth embodiment of the present invention.

DESCRIPTION OF THE PRIOR ART

Figure 1:
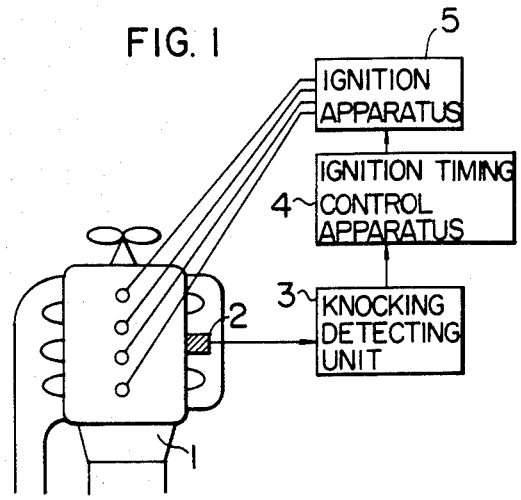
FIG. 1 is a block diagram of an ignition timing control system.
Figure 2:
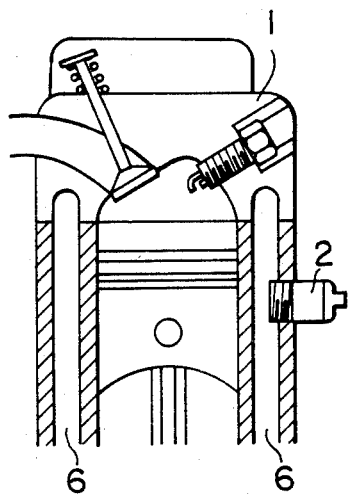
FIG. 2 is an illustration of a manner of mounting of a knocking detection apparatus on a cylinder block of an internal combustion engine.

Referring first to FIG. 2, a knocking detection apparatus 2 is adapted for detecting a knocking by means of sensing a pressure pulsation propagating through cooling water. The knocking detection apparatus 2 has a diaphragm and is screwed to the cylinder block of an internal combustion engine so that the diaphragm is exposed to the cooling water circulating within the water jacket 6 of the internal combustion engine 1. In an ignition timing control system shown in FIG. 1, an output signal from the knocking detection apparatus 2, which corresponds to a pressure pulsation generated by the knocking is received by a knocking detecting unit 3 which processes such signal and outputs as signal to an ignition timing control apparatus 4. In accordance with the output signal from the detection unit 3, the ignition timing control apparatus 4 then outputs a control signal to an ignition apparatus 5 to advance or retard an ignition timing so as to optimize the ignition in the combustion chambers. Sparking plugs mounted on each cylinder of the internal combustion engine 1 sparks to ignite the mixture in accordance with the command signal from the ignition apparatus 5.

Figure 3:
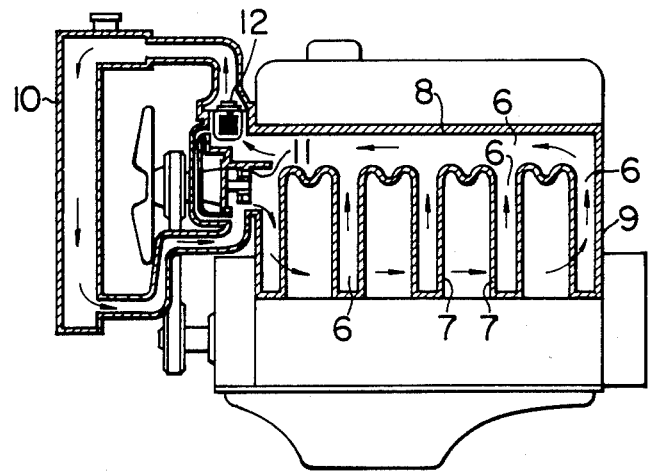
FIG. 3 is a vertical sectional view of a water-cooled internal combustion engine.

A water-cooled internal combustion engine as shown in FIG. 3 has the water jacket 6 formed in a cylinder head 8 and in a cylinder block 9. The water jacket 6 is connected to a radiator 10 through hoses to form a water circuit in which a cooling water is circulated forcibly by a water pump 11 disposed within the water circuit as indicated by arrows. The cooling water carries a heat away from the cylinders 7 and from the cylinder head 8 surrounded by the water jacket 6 and is pumped to the radiator 10 in which the heat is radiated to the ambience. A thermostat 12 is provided in a portion of the water circuit between the water jacket 6 and the radiator 10 to maintain a temperature of the cooling water within the suitable range.

Figure 4:
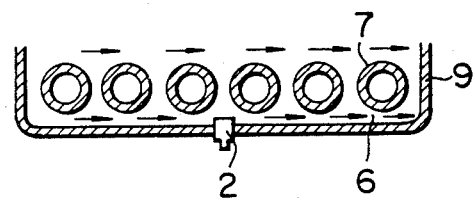
FIG. 4 is a cross-sectional view of a cylinder block of an internal combustion engine having 6 (six) cylinders.

As shown by arrows in FIG. 4, the cooling water circulated in a multi-cylinder engine, e.g. 6-cylinder engine flows from the front side to the rear side of the engine.

Figure 5:
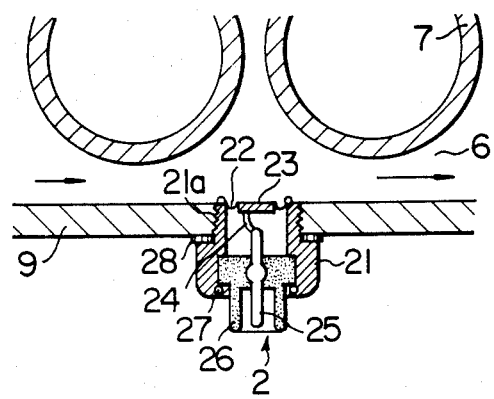
FIG. 5 is a fragmentary cross-sectional view detailedly showing a manner of mounting of a knocking detection apparatus on a cylinder block.

For detecting a knocking occurred in such multi-cylinder engine with a single knocking detection apparatus, it is ordinary to attach the single knocking detection apparatus 2 to a wall portion of the cylinder block corresponding to the middle of the row of the cylinders, as indicated in FIG. 4. FIG. 5 shows detailedly how this knocking detection apparatus is attached to the wall portion of the cylinder block. The knocking detection apparatus 2 has a stepped tubular metallic housing 21 one end periphery of which is threaded and a thin discoid diaphragm 22 made of a conductive material. The diaphragm 22 is fixed at its periphery to one open end of the housing 21 and one end surface of the diaphragm 22 is exposed to the cooling water. The knocking detection apparatus further has a piezoelectric transducer 23 fixed to the other end surface of the diaphragm 22, lead wires 24 connected to the piezoelectric transduce 23, an output terminal 25, a connector 26 made of an insulator and partially embedding the output terminal 25 therein, an "O" ring 27 for airtight sealing and a packing 28 placed between a shoulder of the housing 21 and the wall of the cylinder block 9.

The operation of this knocking detection apparatus 2 is as follows. As a wall of a cylinder 7 is vibrated as a result of a knocking occurred in the cylinder 7, a pressure pulsation propagates through the cooling water circulating in the water jacket 6 and is transmitted to the diaphragm 22 of the detection apparatus 2 attached to the wall of the cylinder block 9, so that the diaphragm 22 is vibrated in response to the pressure pulsation. In consequence, the piezoelectric transduce 23 generates an alternate voltage which is picked up through the output terminal 25 as an output voltage signal.

Figure 6:
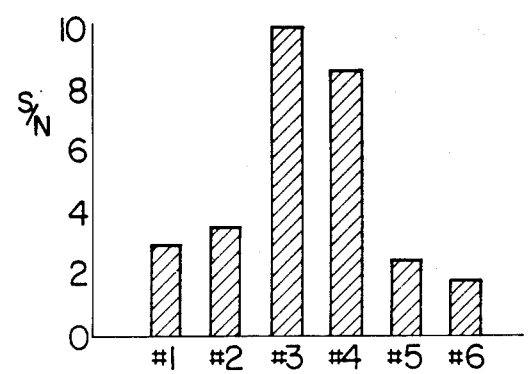
FIG. 6 is a graph showing the sensibility of the knocking detection apparatus shown in FIG. 5 for each of six cylinders.

FIG. 6 shows the sensibility of this conventional knocking detection apparatus 2 for each of the cylinders, as obtained when the apparatus 2 is attached to a wall portion of the cylinder block corresponding to the middle of the row of cylinders so that the diaphragm 23 is substantially flush with the inner surface of the wall of the cylinder block as shown in FIGS. 4 and 5. In FIG. 6, the symbols #1 to #6 represent the cylinders respectively as numbered from the front side to the rear side of the engine.

The sensibility of the detection apparatus is evaluated in terms of the value of S/N ratio which is defined as follows. While the engine is operating in normal state, knocking state is intentionally or willingly created in each cylinder and peak values Vpi of the output voltage from the detection apparatus 2 corresponding to the detected pressure pulsation are sampled for every $N_0$ cycles of combustion ($N_0$ being 1,000 in this case). A cumulative frequency distribution of the peak values Vp is obtained and the peak value Vp corresponding to the cumulative frequency r % (r being 5 in this case) is determined as the value S. Then, the peak values V'pi of the output voltage from the detection apparatus 2 corresponding to the pressure pulsation are sampled for every $N_0$ cycles of combustion ($N_0$ also being 1,000 in this case) under the condition where the engine is operating normally, i.e. in such a condition that no knocking is occurred. A cumulative frequency distribution of the peak values V'p is obtained and the peak value V'p$_0$ corresponding to the cumulative frequency r' % (r' being 3 in this case) is determined as the value N. The S/N ratio is thus defined. It will be seen from the nature of the definition of the S/N ratio described above that the smaller the value r' is, the severer the definition of the S/N ratio becomes. That is, the sensibility evaluated in terms of the S/N ratio defined by smaller value of r' becomes higher even when the value of the S/N ratio itself is equal.

For this reason, as will be clearly seen from FIG. 6, the sensibility of the knocking detection apparatus 2 for the cylinders disposed at a downstream space from the knocking detection apparatus is lower than that for the cylinders disposed at an upstream space from the same as viewed in the direction of flow of the cooling water. Namely, according to the conventional arrangement, it is difficult to detect a knocking occurred in the cylinders disposed at a downstream space from the knocking detection apparatus as compared with the cylinders disposed at an upstream space from the same as viewed in the direction of flow of cooling water.

SUMMARY OF THE INVENTION

Accordingly, an object of the present invention is to provide an apparatus for detecting a knocking occurred in one or more cylinders of a multi-cylinder engine, in which the sensibility for any one of cylinders of the engine is improved so as to eliminate any remarkable low sensibility.

The object, features and advantages of the present invention will become more clear from the following description of the preferred embodiment referring to the accompanying drawings.

DETAILED DESCRIPTION OF THE PREFERRED EMBODIMENTS

Figure 7:
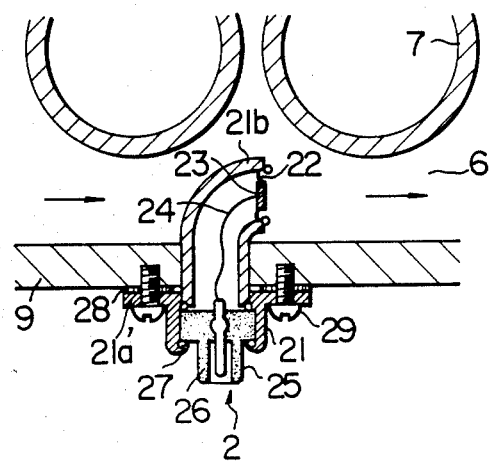
FIG. 7 is a fragmentary cross-sectional view of a knocking detection apparatus for an internal combustion engine, constructed in accordance with an embodiment of the present invention.

Referring to FIG. 7, a reference numeral 2 designates apparatus mounted on a wall of a cylinder block 9 of a multi-cylinder engine having a plurality of cylinders 7. A reference numeral 6 designates a water jacket 6 through which a cooling water flows. The knocking detection apparatus 2 has a flanged tubular housing 21 to the inner surface of one end of which welded is one end of an elbow-like tubular holder 21b bent in a substantially L-shaped form. A thin discoid diaphragm 22 is fixed at its periphery to the other end of the elbow-like tubular holder 21b. The housing 21 is fixed at its flange portion 21a' to the cylinder block by means of screws 29 in such a manner that one end surface of the diaphragm 22 faces a space defined by a wall portion of the cylinder block positioned in a downstream side from the knocking detection apparatus as viewed in the direction of flow of the cooling water. A piezoelectric transducer 23 is fixed to the other end surface of the diaphragm 22. Other portions are materially identical to those of the knocking detection apparatus shown in FIG. 5.

The knocking detection apparatus of the present invention having the construction described hereinbefore offers the following advantage. Namely, since the diaphragm which vibrates in response to the pressure pulsation is directed to the space downstream from the knocking detection apparatus as viewed in the direction of flow of the cooling water, it is possible to detect the pressure pulsation generated as a result of knocking occurred in a cylinder positioned in a space downstream from the detection apparatus at a sensibility which is not extremely low as compared with that for a cylinder positioned in a space upstream from the detection apparatus. In other words, the knocking sensibility for every cylinder of the engine is generally uniformalized.

Figure 8:
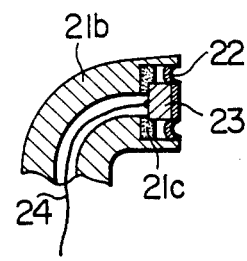
FIG. 8 is a fragmentary sectional view of a portion of a knocking detection apparatus in accordance with a second embodiment of the present invention.

In the embodiment shown in FIG. 7, a piezoelectric transduce 23 is merely fixed to the other end surface of the diaphragm 22. This, however, is not exlusive and may be changed or modified as desired. For instance, in another embodiment of the present invention shown in FIG. 8, one end surface of the piezoelectric transducer 23 is secured to the diaphragm 22 and the other end surface of the same is pressed to an insulating member 21c. The transducer to be fixed to the diaphragm is not exclusive to the piezoelectric type transducer and any type of transduce capable of generating voltage signal in response to the deflection of the diaphragm may be usable as such transducer. For instance, it is possible to use a transducer which relies upon an electromagnetic induction.

Figure 9:
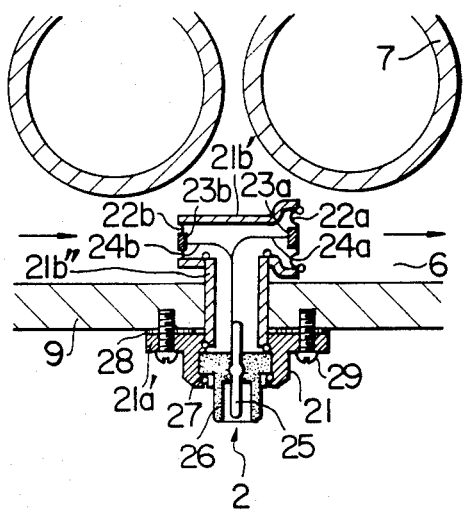
FIG. 9 is a fragmentary cross-sectional view of a knocking detection apparatus in accordance with a third embodiment of the present invention.

FIG. 9 shows a knocking detection apparatus in accordance with still another embodiment of the invention. This knocking detection apparatus has a first tubular holder 21b' having two end openings of different inner diameters. A second tubular holder 21b'' is fixed at its one end to the inner peripheral surface of one end of a flanged tubular housing 21 and at the other end to an opening of the wall of the first tubular holder 21b' which is formed substantially in axially midpoint thereof. Discoid diaphragms 22a and 22b are fixed by welding at their peripheries to both end openings of the first holder 21b' so as to form pressure receiving surfaces. Piezoelectric transducers 23a and 23b are fixed to the diaphragms 22a and 22b respectively and are connected electrically to an output terminal 25 through leads 24a and 24b. The housing 21 is secured at its flange 21a' to the cylinder block 9 by means of screws 29 in such a manner that the diaphragm 22a welded to the larger diameter end of the first holder 21b' is directed to the downstream space from the position of the knocking detection apparatus as viewed in the direction of flow of cooling water, while the diaphragm 22b welded to the smaller diameter end of the first holder 21b' is directed to the upstream space from the same as viewed in the direction of flow of water. Other arrangement is materially identical to that of the embodiment shown in FIG. 7.

Figure 10:
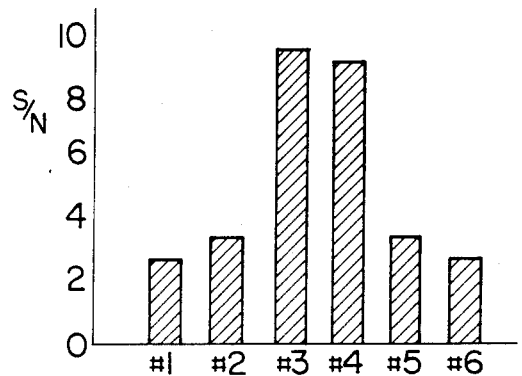
FIG. 10 is a graph showing the sensibility of the knocking detection apparatus shown in FIG. 9 for each of cylinders.

In the knocking detection apparatus of this embodiment, since the diaphragm 22b is faced to the upstream space from the position of the detection apparatus as viewed in the direction of flow of the cooling water, it is possible to detect a knocking occured in the cylinders disposed at the upstream space without substantial deterioration of sensibility therefor. In addition, since diaphragm 22a is faced to the downstream space from the position of the detection apparatus as viewed in the direction of flow of the cooling water and has a pressure receiving area larger than that of the diaphragm 22b for increasing the sensibility, it is also possible to detect a knocking occurred in the cylinders disposed at the downstream space i.e., cylinders #5 and #6 under a sensibility not so lower than that for the cylinders at the upstream space. According to this embodiment, therefore, it is possible to obtain a more uniform distribution of sensibility for every cylinders of the engine, as shown in FIG. 10 and the sensibility of the detection apparatus as a whole is much improved advantageously.

Figure 11:
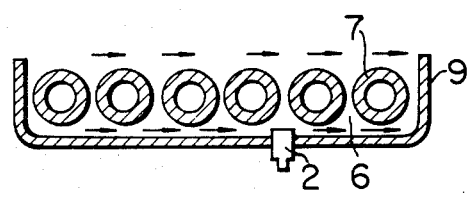

FIG. 11 shows a further embodiment of the present invention in which the knocking detection apparatus is secured at a portion of the wall of the cylinder block downstream from the middle of the row of cylinders, e.g. to a portion between the fourth and fifth cylinders #4 and #5 so that the diaphragm is exposed to the cooling water in the water jacket. In this case, the diaphragm may be flush with the inner surface of the wall of the cylinder block 9.

Figure 12:
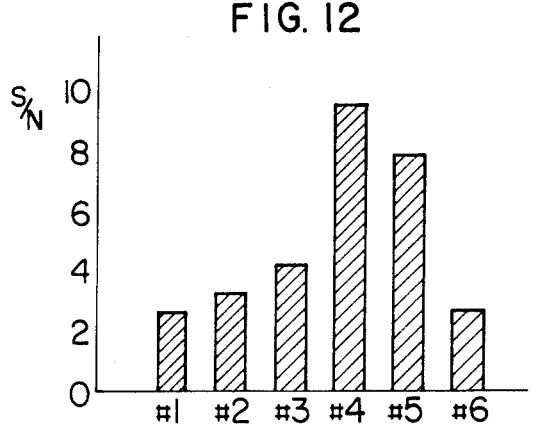
FIG. 12 is a graph showing the sensibility of the knocking detection apparatus shown in FIG. 11 for each of cylinders.

FIG. 12 shows the sensibility of this knocking detection apparatus for every cylinders which is obtained by the same manner described above. It will be seen that in the knocking detection apparatus of this embodiment the levels of sensibility for the fifth and sixth cylinders #5 and 190 6 are somewhat higher than those shown in FIG. 6, while the levels of sensibility for the upstream cylinders #1 and #2 are somewhat higher than those shown in FIG. 6, while the levels of sensibility for the upstream cylinders #1 and #2 are somewhat lower than those shown in FIG. 6, so that the sensibility of the knocking detection apparatus as a whole is uniformalized and improved advantageously.

As has been described, according to the present invention, it is possible to uniformalize the sensibility distribution over the entire row of cylinders. Namely, a remarkable wide dispersion of sensibility which is inevitable in the conventional knocking detection apparatus is eliminated and the knocking occurred in any one of the cylinders can be detected at a substantially high sensibility.

Although the invention has been described through specific terms, it is to be understood that various changes and modifications may be imparted thereto without departing from the scope of the present invention which is limited solely by the appended claims.

What is claimed is:

1. An apparatus for detecting knocking occurring in at least one of aligned cylinders in a cylinder block of an internal combustion engine, comprising:

sensing means, mounted on a mounting portion of a wall of said cylinder block, for sensing pressure pulsations propagating through cooling water which flows around said cylinders in said cylinder block, said sensing means including first and second diaphragm means, each comprising a diaphragm, one surface of which is exposed to said cooling water in a space defined by said wall of said cylinder block and said cylinders, and a transducer, secured to the other surface of each of said diaphragms, for outputting signals corresponding to pressure changes caused by said pulsations, said one surface of the diaphragm of said first means being located downstream from said mounting wall portion with respect to the flow of cooling water, and said one surface of the diaphragm of said second means being located upstream from said mounting wall portion with respect to the flow of cooling water, wherein said first diaphragm means has a higher sensitivity to pressure changes than does said second diaphragm means.

2. An apparatus according to claim 1, wherein:

said mounting wall portion is located downstream from a wall portion of said cylinder block corresponding to the middle of a row of said aligned cylinders.

3. An apparatus for detecting knocking occurring in at least one of aligned cylinders of an internal combustion engine, comprising:

sensor means, mounted in a mounting portion of a wall of said cylinder block, for sensing pressure pulsations propagating through cooling water which flows around said cylinders in a cylinder block, said sensor means including means, comprising a diaphragm having one surface exposed to said cooling water, and a transducer, secured to the other surface of said diaphragm, for outputting signals corresponding to pressure changes caused by said pulsations, wherein said mounting wall portion is located downstream from but not at the end of a wall portion of said cylinder block corresponding to the middle of a row of said aligned cylinders such that the respective sensitivities of said sensor means against an uppermost cylinder and a downmost cylinder are substantially equal to each other.

4. An apparatus for detecting knocking occurring in at least one of aligned cylinders of an internal combustion engine, comprising:

a sensor means, mounted in a mounting portion of a wall of said cylinder block, for sensing pressure pulsations propagating through cooling water which flows around said cylinders in a cylinder block;

said sensor means including means, comprising a diaphragm having one surface exposed to said cooling water, and a transducer, secured to the other surface of said diaphragm, for outputting signals corresponding to pressure changes caused by said pulsations, wherein said mounting wall portion is located downstream from a wall portion of said cylinder block corresponding to the middle of a row of said aligned cylinders; and; further comprising another means comprising a diaphragm, one surface of which is exposed to said cooling water, and a transducer, secured to the other surface of said diaphragm, for outputting signals corresponding to pressure changes caused by said pulsations, all diaphragms located perpendicular to the flow of said cooling water; wherein sensitivity of one of said means comprising a diaphragm is higher than that of the other means comprising a diaphragm.

* * * * *